(12) United States Patent
Resnick et al.

(10) Patent No.: US 8,607,085 B2
(45) Date of Patent: Dec. 10, 2013

(54) POWER SAVING SECONDARY PROCESSING UNIT FOR AN ELECTRONIC DEVICE

(75) Inventors: Russell A. Resnick, Raleigh, NC (US); Howard Locker, Cary, NC (US); Mark C. Davis, Durham, NC (US); David C. Challener, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1038 days.

(21) Appl. No.: 12/341,626

(22) Filed: Dec. 22, 2008

(65) Prior Publication Data

US 2010/0162015 A1    Jun. 24, 2010

(51) Int. Cl.
*G06F 1/00* (2006.01)
(52) U.S. Cl.
USPC ......................................................... 713/323

(58) Field of Classification Search
USPC .................................................. 713/300, 320
See application file for complete search history.

(56) References Cited

U.S. PATENT DOCUMENTS

| | | | |
|---|---|---|---|
| 6,725,396 B2* | 4/2004 | Ahrens et al. | 713/2 |
| 7,690,031 B2* | 3/2010 | Ma et al. | 713/172 |
| 2005/0066209 A1* | 3/2005 | Kee et al. | 713/323 |
| 2005/0076256 A1* | 4/2005 | Fleck et al. | 713/320 |
| 2006/0061563 A1* | 3/2006 | Fleck | 345/211 |
| 2010/0042691 A1* | 2/2010 | Maguire | 709/206 |

* cited by examiner

*Primary Examiner* — Mohammed Rehman
(74) *Attorney, Agent, or Firm* — Ference & Associates LLC

(57) ABSTRACT

The instant invention broadly contemplates an energy saving subsystem comprising a secondary CPU that utilizes less power than a main CPU, thereby allowing an electronic device (e.g. a laptop PC) having the secondary CPU to use less power and run for longer periods of time on a limited power supply. Thus, the invention permits the electronic device to be utilized for extended periods and extends the battery life.

19 Claims, 4 Drawing Sheets

POWER SAVING SECONDARY PROCESSING UNIT FOR AN ELECTRONIC DEVICE

FIELD OF THE INVENTION

The present invention relates generally to power saving arrangements for an electronic device, such as a laptop personal computer (PC). Specifically, the instant invention provides an electronic device with an energy saving subsystem.

BACKGROUND OF THE INVENTION

Electronic devices such as laptop PCs suffer from a problem related to energy consumption. Particularly, the battery life of a laptop PC is fairly short. Even using conventional power saving schemes, the useful battery life for a laptop PC is, for example, two to three hours in real use. Various power saving schemes are known in the art. Conventional solutions commonly add a larger battery or run the main central processing unit (CPU) slower. However, each conventional solution is limited to providing only a minimal energy savings and contemporary operating systems (OS) do not perform well in this environment.

Therefore, a need has arisen to provide an electronic device that conserves energy and allows for extended use without compromising performance.

SUMMARY OF THE INVENTION

The instant invention broadly contemplates an energy saving subsystem comprising a secondary CPU, preferably implemented on a CPU card. The CPU card includes at least a secondary CPU that utilizes less power than a main CPU, thereby allowing the electronic device (e.g. a laptop PC) having the CPU card to run for longer periods of time on a limited power supply. Thus, the invention permits the electronic device to be utilized for extended periods, extending the battery life without suffering a loss in performance.

Thus, there is broadly contemplated herein, in accordance with at least one presently preferred embodiment of the invention, arrangements that provide an add-on to a modified base electronic device or system (e.g. a laptop PC) without the base system incurring additional cost. The add-on to the base system comprises a CPU card which itself comprises a secondary CPU, an OS (e.g. in flash) in memory, connectors and input/output (IO) switches. When this CPU card is added to the base electronic system, the wiring that normally connects the motherboard is routed to the new CPU card. The new CPU card has connectors to mate with these wires. Additional wiring is added as part of the CPU card (kit) and is routed from the CPU card to other components of the base system (e.g. keyboard and panel(s)). In this manner, the CPU card can use the components of the base system (e.g. keyboard and panel) and so can the base/main system. Thus, there is broadly contemplated a CPU card that allows a laptop PC to operate on a secondary, lower powered CPU such that a user can perform certain computing functions and allow the battery to last longer.

In summary, one aspect of the invention provides an apparatus comprising: a central processing unit card, the central processing unit card comprising: a secondary central processing unit; and a secondary memory in operable connection with the secondary central processing unit; wherein the secondary central processing unit is configured to execute a secondary operating system that selectively controls at least one component of a base system rather than a main central processing unit configured to execute a first operating system of the base system.

An additional aspect of the invention provides an apparatus comprising: (a) a base system, the base system comprising: a main central processing unit; and a system memory in operable connection with the main central processing unit, the main central processing unit being configured to execute a first operating system; and (b) a central processing unit card, the central processing unit card comprising: a secondary central processing unit; and a secondary memory in operable connection with the secondary central processing unit, the secondary central processing unit being configured to execute a secondary operating system; wherein the secondary operating system selectively controls at least one component of the base system rather than the first operating system.

A further aspect of the present invention provides an apparatus comprising: (a) a base system comprising: a main central processing unit; and a system memory in operable connection with the main central processing unit, the main central processing unit being configured to execute a first operating system; and (b) a subsystem in operable connection with the base system; the subsystem comprising: a secondary central processing unit; and a subsystem memory in operable connection with the secondary central processing unit, the secondary central processing unit being configured to execute a secondary operating system; wherein the subsystem is configured to selectively control the apparatus rather than the base system in response to a pre-boot instruction.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
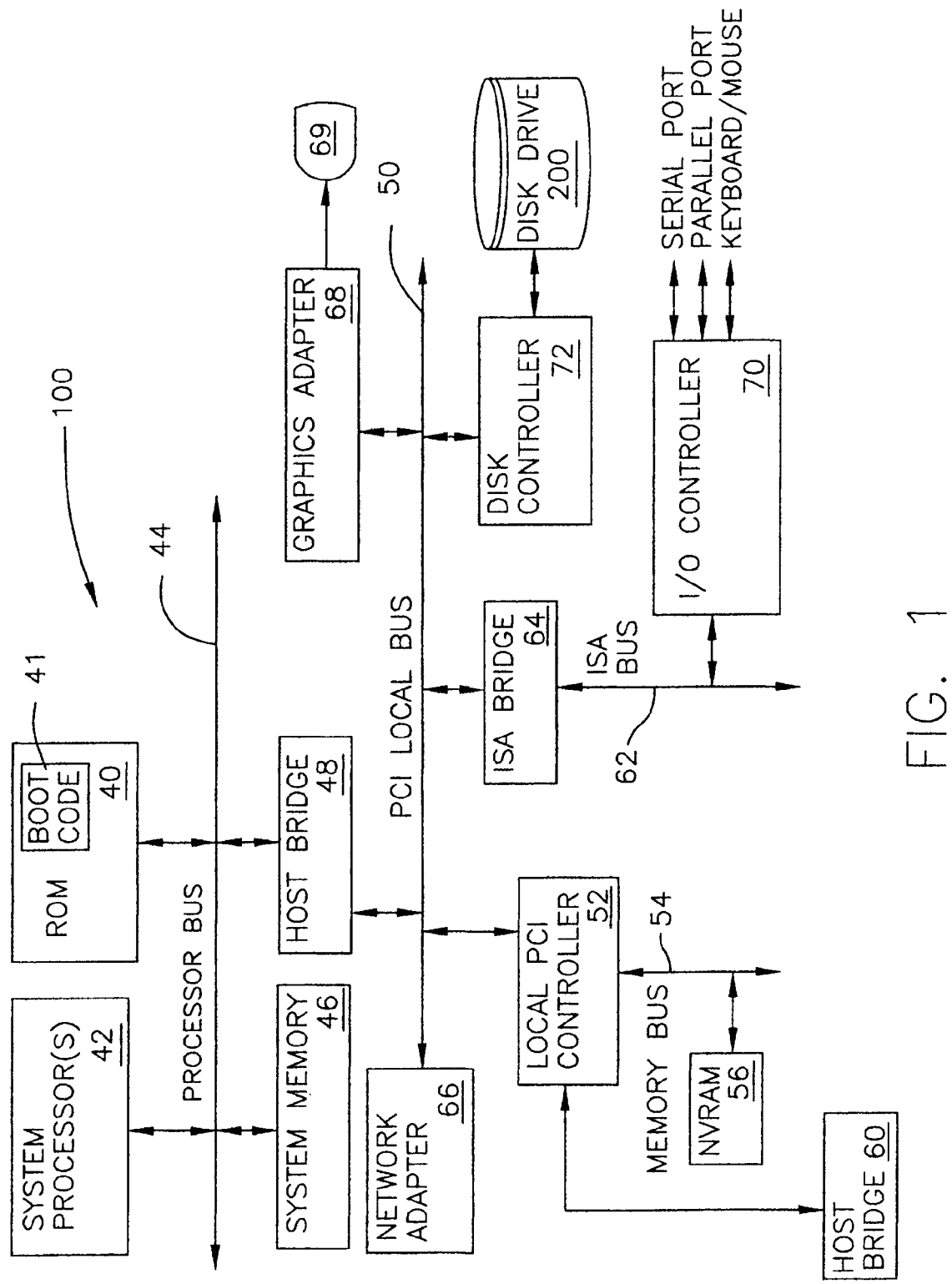
FIG. 1 is a block diagram of a computing system according to at least one embodiment of the invention.

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided, to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of devices, systems, processes, etc. that are consistent with the invention as claimed herein.

The following description begins with a general overview of the instant invention. The description will then turn to a more detailed description of preferred embodiments of the instant invention with reference to the accompanying drawings.

As noted above, a typical laptop PC has only several hours of useful battery life, even when conventional power saving schemes are employed. Therefore, according to one embodiment of the instant invention, an energy saving subsystem is added to a laptop PC such that using the same power supply (e.g. the same battery), the laptop PC is enabled to run longer, using less power. The subsystem can perform most all of the functions of the conventional laptop PC running on the base system, but in a lower power state, thus conserving power and extending battery life. The subsystem accomplishes this by using a secondary CPU that inherently draws less power.

According to one embodiment of the instant invention, this secondary CPU can be added to the main system by way of a card (e.g. a PCI express mini card as described by the PCI Special Interest Group). The secondary CPU embodied on the CPU card has a much lower power profile than the main system CPU. Thus, utilizing a laptop PC that has the CPU card, a user is enabled to enjoy many common applications of the main system but do so using less power.

According to one embodiment of the invention, an electronic device contains a modified base system. The base system has a main CPU as well as the other components typically found on a laptop PC (see FIG. 1.). For example, the main CPU included with the base system of the laptop PC may preferably include a Core 2 Duo processor made by INTEL Corp. While this main CPU is optimized for mobile usage, it typically only yields a base system with a useful battery life of two to three hours. Thus, the modified base system is adapted to incorporate a secondary CPU, preferably embodied on a CPU card.

Therefore, according to one embodiment of the instant invention, a subsystem is added to the main system. The subsystem comprises a CPU card that contains a secondary CPU that inherently draws less power than the main system CPU. Preferably this CPU card contains a secondary CPU that is instruction set compatible. The secondary CPU is preferably an Intel® Atom™ Processor (See http://www.intel.com/technology/atom/index.htm). The Intel® Atom™ Processor is a lower powered CPU microarchitecture that is instruction set compatible. However, those with ordinary skill in the relevant art will recognize that other, lower powered CPUs may be utilized as a secondary CPU, even if not instruction set compatible (e.g. a low powered processor made by ARM Ltd., see http://www.arm.com). It should be noted that even using another lower power processor (such as a lower powered processor made by ARM Ltd.) a user is enabled to perform a significant range of functions (e.g. utilize email and a web browser) utilizing different applications.

According to one embodiment of the instant invention, the secondary CPU chosen preferably utilizes less power than the main system's CPU but provides the user with suitable performance for specific applications. For example, users running email, chat, web browsing, word processing, or optical drive (e.g. DVD) applications may only notice a minimal amount of reduced performance when utilizing the secondary CPU. This greatly extends the battery life of the laptop PC while only minimally sacrificing the performance of specific applications. Use of the secondary CPU to play a DVD is an exemplary use case for the instant invention. For example, a standard laptop used as a DVD player (e.g. on an airplane) will provide only two to three hours of useful battery life. However, a laptop PC having the secondary CPU and chipset optimized for DVD playback may provide up to eight to nine hours of useful battery life.

According to one embodiment of the instant invention, the CPU card is a factory installed option (i.e. by the original equipment manufacturer (OEM)). Those with skill in the relevant art will recognize, however, that the subsystem could be provided as part of a unique motherboard itself. However, a CPU card implementation is presently preferred as it reduces cost and maintains flexibility for users to choose between a base motherboard and a motherboard having the add-on subsystem (i.e. the CPU card). Thus, a user could obtain a base notebook computer and opt to have the CPU card added as well.

According to one embodiment of the instant invention, upon booting the laptop PC, the user may select whether the CPU card or the main system (CPU) is to be operable. The user could instruct the initial BIOS code routines to route the electrical signals at the pre-boot level such that the CPU card is bypassed or enabled, as desired. In other words, the user may switch between the main system CPU and the secondary CPU. This is accomplished by properly routing the electrical signals through the electronic device to use either of the CPUs, described further below. Those having ordinary skill in the art will recognize that other methods of enabling/disabling the CPU card and the main system are available and fall within the scope of the invention.

According to one embodiment of the instant invention, the electrical signals used to control the laptop PC are either routed through the main CPU of the base system or through the secondary CPU card depending upon the mode the user chooses to operate the laptop PC in. For example, the electrical signals for controlling the display device have to be routed to the display. Those electrical signals have one sink and two sources. The two sources are the main CPU and the secondary CPU. A switch is a way of directing those signals to the display. The switch could be an external switch (e.g. a button on the outside of the unit) or could be a software implemented switch (e.g. system default that could be changed by the user). The essential function of a switch utilized is to provide for proper routing of the electrical signals, either through the main CPU/system or through the CPU card, depending upon the use scenario. The switching process can be implemented, for example, by having the BIOS code program the switch(es) during the pre-boot process.

According to one embodiment of the invention, the CPU card contains its own operating system in flash memory. The operating systems could be selected from one of several versions of LINUX or embedded Microsoft Windows XP®. Other operating systems could be suitably adapted as well. The CPU card could have a solid state drive attached. Thus, the configuration chosen for the CPU card in this regard is largely a function of size. For example, the CPU card could include flash modules that emulate the flash drive plus have the OS.

According to one embodiment of the instant invention, the memory contained on the CPU card is the subsystem memory utilized for the subsystem that is running on the CPU card. Preferably, the subsystem does not utilize the base system's memory. The CPU card contains the necessary 10 switches for selectively utilizing devices (of the base system). Thus the base system (having a main CPU) and the subsystem (having a secondary CPU) operate different OS(s) and share inputs/outputs, but share data through an external means (e.g. the system and subsystem do not share memory). For example, a keyboard is enabled to drive either the OS that is running on the main/base system or the OS that is running on the subsystem (i.e. the CPU card) depending on how electrical signals are routed. The 10 switches enable switching the keyboard between these alternatives. As another example, in utilizing the secondary CPU to play a DVD, the optical drive signal would have to run up to the CPU card and then be switched back down to the main motherboard such that when the secondary CPU is not being utilized, the main system CPU can have access to the optical drive signals.

According to one embodiment of the instant invention, the CPU card supports selected functions of a main system OS by utilizing a modified or secondary OS of the CPU card. For example, a secondary OS is run from the CPU card to enable word processing. This could be a simplified version of an OS that can be adapted suitably for mobile use. The CPU card can store word processing documents in secondary memory that can be manipulated while running the electronic device under the secondary CPU. These could be transferred (e.g. over a network connection) and stored or stored/transferred locally (e.g. on a removable storage device). Those having ordinary skill in the relevant art will recognize that other devices may be alternatively utilized (e.g. wireless signal) via either the main CPU of the base system or the secondary CPU of the CPU card. However, the amount of devices (and their associated functions) supported by the subsystem (e.g. USB ports, etc.) will be a function of how much power saving is desired.

According to one embodiment of the instant invention, the CPU card can be tailored to a user's particular needs by supporting selected functions. For example, a user may select a CPU card that is optimized to run the optical drive (e.g. for playing a DVD) for extended periods of time given the available battery life. Another user may select a CPU card optimized for Internet applications (e.g. Internet chat). Still another user may select a CPU card optimized to enable remote access to a base workstation (e.g. a desktop computer located in an office) and/or word processing applications. The OS of the CPU card could be a modified version of an OS and OS applications (e.g. Microsoft Word® word processing applications) optimized to contain the essentials of the application for the particular user mode. Those skilled in the relevant art will recognize that other optimized versions of the CPU card are available and are considered to be within the scope of the invention.

Referring now to the figures, presently preferred embodiments of the instant invention will be described with reference to accompanying figures and the scope of the invention will be pointed out in the appended claims.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the ThinkStation®, which are sold by Lenovo (US) Inc. of Morrisville, N.C.; however, as will become apparent from the following description, the present invention is applicable to operation by any data processing system.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
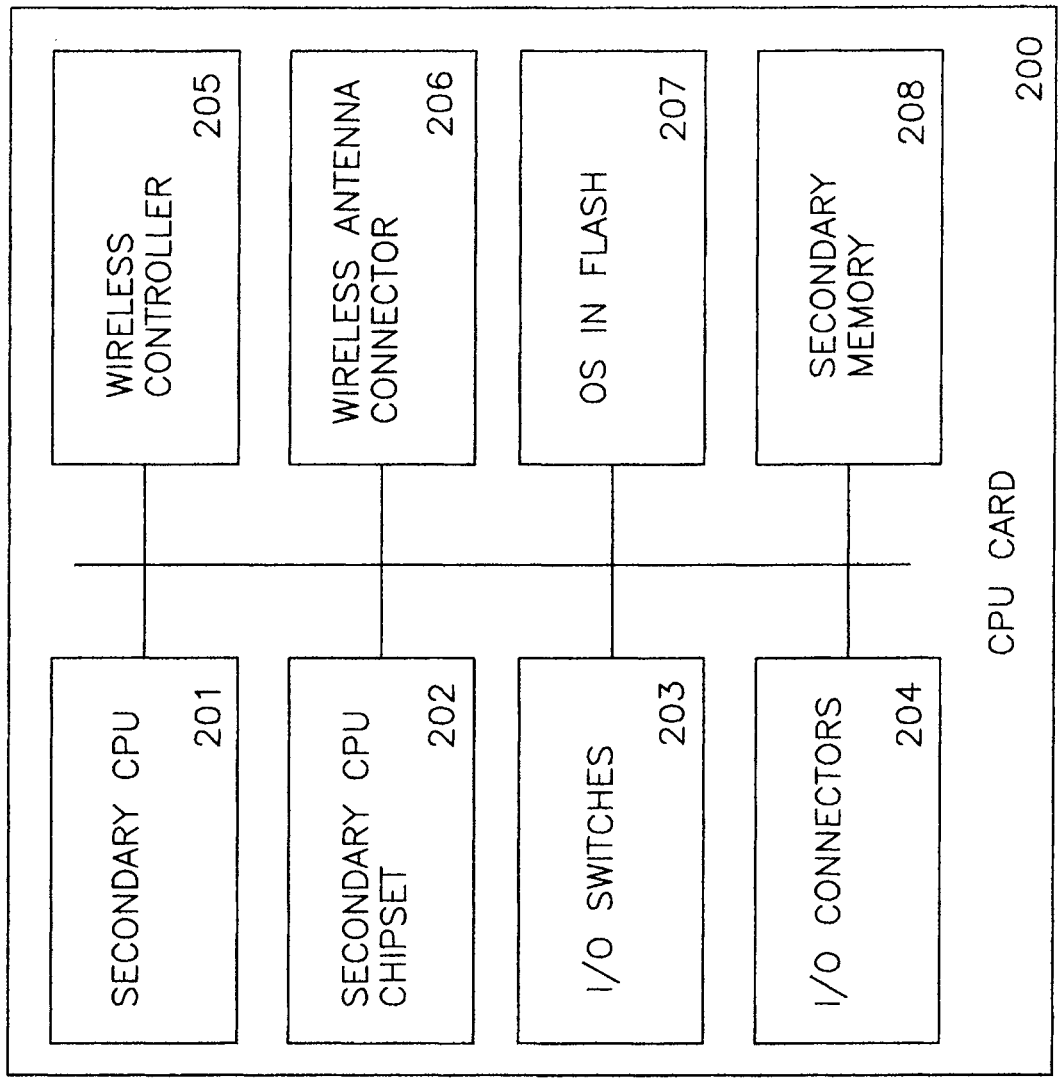
FIG. 2 shows a block diagram of a CPU card according to at least one embodiment of the invention.

FIG. 2 shows a block diagram of a CPU card (200) according to the instant invention. The CPU card (200) is preferably implemented on a PCI express mini card. The CPU card (200) includes a secondary CPU (201), a secondary CPU chipset (202), I/O switches (203), I/O connectors (204), a wireless controller (205), a wireless antenna connector (206), an OS in flash (207), and a memory (208). The antenna connector (206) attaches to the wireless controller (205), the I/O connectors (204) attach to the I/O switches (203), the I/O switches (203) attach to the secondary CPU chipset (202) which in turn attaches to a CPU bus. Thus, the CPU card (200) contains the elements recounted above in order to enable it to function as herein described. Alternative arrangements are conceivable and those having ordinary skill in the relevant art will recognize that the elements of the CPU card can be suitably arranged to achieve sufficient performance commensurate with the invention as described herein.

Figure 3:
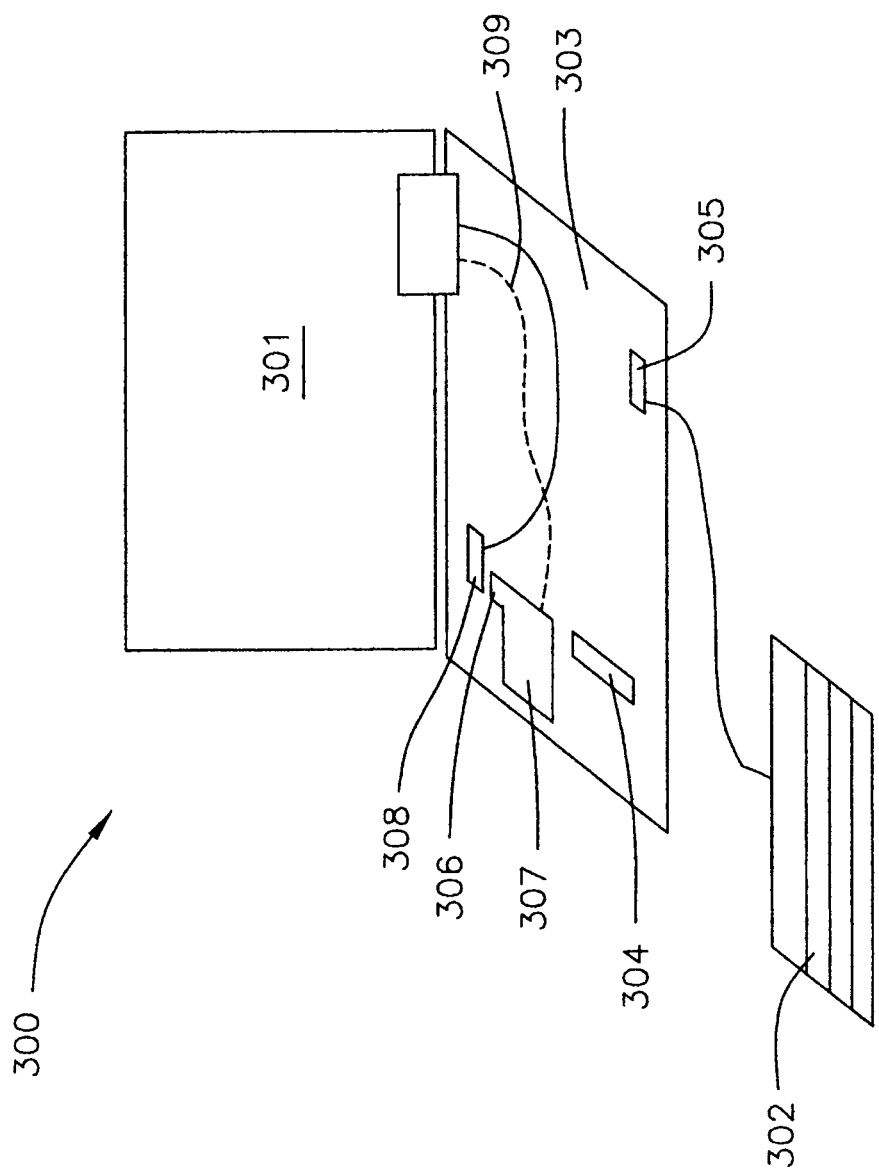
FIG. 3 is a block diagram of a base system without the CPU card inserted according to at least one embodiment of the invention.

FIG. 3 is a block diagram of a modified base system (300) without the CPU card (200) inserted according to one embodiment of the instant invention. The modified base system (300) is preferably an electronic device such as the computer system described in FIG. 1 (e.g. a laptop PC); however, those having ordinary skill in the relevant art will recognize the instant invention is generally applicable to other electronic devices. The modified base system (300) includes a display panel (301), a keyboard (302), a system motherboard (303) a secondary CPU motherboard connector (304), a motherboard keyboard connector (305), a wireless slot (306), a wireless card (307), a motherboard display connector (308) and a wireless antenna cable (309). Together, these elements of modified base system (300) are arranged such that the base system can be easily adapted to accept the CPU card. Thus, modified base system (300) is configured in such a way, for example as depicted in FIG. 3, so as to be readily adapted upon a user selecting the option of including the CPU card.

Figure 4:
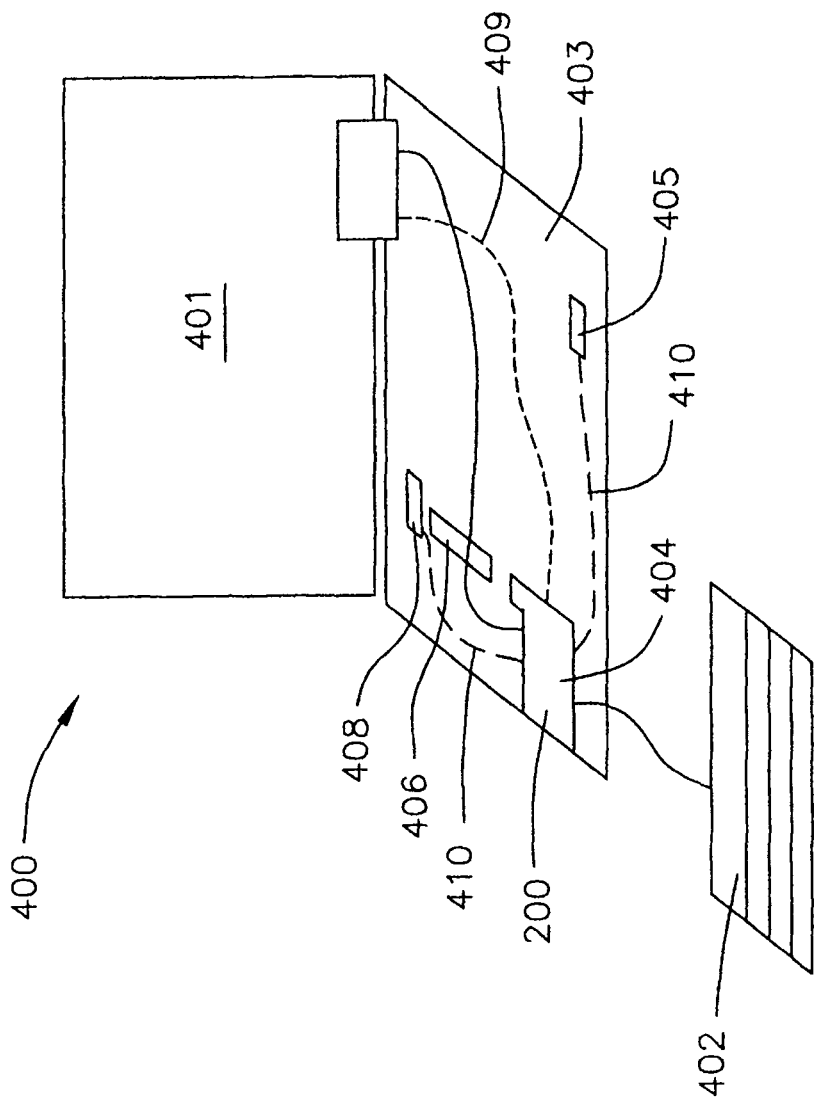
FIG. 4 is a block diagram of a base system having the CPU card embodied therein according to at least one embodiment of the invention.

FIG. 4 is a block diagram of a modified base system (400) having the secondary CPU card (200) embodied therein. Again, modified base system (400) is preferably an electronic device such as that described in FIG. 1; however, those having ordinary skill in the relevant art will recognize the instant invention is generally applicable to other electronic devices. The modified base system (400) includes a display panel (401), a keyboard (402), a system motherboard (403), a secondary CPU motherboard connector (404), a motherboard keyboard connector (405), a wireless slot (406), a motherboard display connector (408) and a wireless antenna cable (409). The CPU card (200) addition is facilitated by additional wiring (410) added to modified base system (400) to accommodate routing of necessary electric signals through the CPU card (200), as shown. The secondary CPU motherboard connector includes power, PCI express, and signaling configured to inform the main board if a CPU card (200) is installed. Notably, modified base system (400) preferably does not include a wireless card (307) according to one embodiment of the invention. The capabilities of the wireless card are preferably contained within the CPU card (200) and thus the wireless card is unnecessary in this implementation. Thus, the wireless antenna cable (409) is moved to the CPU card. The modified base system (400) and the CPU card share the same wiring since the modified base system (400) and the CPU card (200) are not utilized simultaneously.

To briefly recapitulate, there is broadly contemplated in accordance with at least one presently preferred embodiment of the instant invention an energy saving subsystem having a CPU card that is added to a base system to enable the base system to run certain applications for a longer period of time on a given power supply. Thus, at least one embodiment of the instant invention includes a CPU card that utilizes a lower powered, secondary CPU for extending battery life of an electronic device, such as a laptop PC.

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   a central processing unit card inserted into a base system as add-on, the central processing unit card comprising:
      a secondary central processing unit; and
      a secondary memory accessible by the secondary central processing unit;
      wherein the secondary central processing unit is configured to execute a secondary operating system that operates the base system of the apparatus at a lower power level than a main central processing unit configured to execute a first operating system of the base system;
      wherein the secondary operating system that operates the base system at a lower power level operates a main display of the apparatus to display data associated with a base system application run by the secondary operating system.

2. The apparatus according to claim 1, wherein the first and secondary operating systems share inputs and outputs via input/output switching but do not share a memory.

3. The apparatus according to claim 2, wherein a system memory of the base system is not accessible to the secondary central processing unit.

4. The apparatus according to claim 1, wherein the central processing unit card further comprises at least one of: input/output switches; input/output connectors; a wireless controller; and a wireless antenna connector.

5. The apparatus according to claim 1, wherein the central processing unit card is configured to execute the secondary operating system responsive to a pre-boot instruction.

6. The apparatus according to claim 1, further comprising:
   at least one connector that enables connection of additional wiring to couple the central processing unit card with the base system of the apparatus.

7. The apparatus according to claim 1, wherein the secondary memory is only accessible to the secondary central processing unit.

8. The apparatus according to claim 1, wherein the base system comprises an optical drive.

9. The apparatus according to claim 1, further comprising:
   a battery configured to power the apparatus;
   wherein operating the base system of the apparatus at a lower power level increases a life of the battery.

10. The apparatus according to claim 1, wherein the central processing unit card is optimized for at least one base system function.

11. An apparatus comprising:
   (a) a base system, the base system comprising:
      a main central processing unit; and
      a system memory accessible by the main central processing unit, the main central processing unit being configured to execute a first operating system; and
   (b) a central processing unit card inserted into the base system as add-on, the central processing unit card comprising:
      a secondary central processing unit; and
      a secondary memory accessible by the secondary central processing unit, the secondary central processing unit being configured to execute a secondary operating system;

wherein the secondary operating system operates a base system of the apparatus at a lower power level than the first operating system;

wherein the secondary operating system that operates the base system at a lower power level operates a main display of the apparatus to display data associated with a base system application run by the secondary operating system.

12. The apparatus according to claim 11, wherein the first and secondary operating systems share inputs and outputs via input/output switching but do not share a memory.

13. The apparatus according to claim 12, wherein the system memory is not accessible to the secondary central processing unit.

14. The apparatus according to claim 11, wherein the central processing unit card further comprises at least one of: input/output switches; input/output connectors; a wireless controller; and a wireless antenna connector.

15. The apparatus according to claim 11, wherein the secondary operating system of the central processing unit card is configured to execute the secondary operating system responsive to a pre-boot instruction.

16. The apparatus according to claim 11, further comprising:

at least one connector that enables connection of additional wiring to couple the central processing unit card with the base system of the apparatus.

17. The apparatus according to claim 11, wherein the secondary memory is only accessible to the secondary central processing unit.

18. The apparatus according to claim 11, wherein the at least one component of the base system comprises an optical drive.

19. An apparatus comprising:
  (a) a base system comprising:
    a main central processing unit; and
    a system memory accessible by the main central processing unit, the main central processing unit being configured to execute a first operating system; and
  (b) a subsystem coupled with the base system; the subsystem comprising:
    a secondary central processing unit card inserted into the base system as add-on; and
    a subsystem memory accessible by the secondary central processing unit card, the secondary central processing unit being configured to execute a secondary operating system;

wherein the subsystem is configured to selectively control the apparatus rather than the base system in response to a pre-boot instruction;

wherein the secondary operating system that operates the base system at a lower power level operates a main display of the apparatus to display data associated with a base system application run by the secondary operating system.

* * * * *